United States Patent
Dreulle et al.

(10) Patent No.: US 6,841,293 B1
(45) Date of Patent: Jan. 11, 2005

(54) BOX FOR SET OF ELECTRIC STORAGE BATTERIES

(75) Inventors: Claude Maurice Dreulle, Beaurains (FR); Pierre Georges Lenain, Arras (FR)

(73) Assignee: Hawker SA, Arras (FR)

( * ) Notice: Subject to any disclaimer, the term of this patent is extended or adjusted under 35 U.S.C. 154(b) by 0 days.

(21) Appl. No.: 09/914,040

(22) PCT Filed: Mar. 10, 2000

(86) PCT No.: PCT/FR00/00597

§ 371 (c)(1),
(2), (4) Date: Aug. 22, 2001

(87) PCT Pub. No.: WO00/54348

PCT Pub. Date: Sep. 14, 2000

(30) Foreign Application Priority Data

Mar. 11, 1999 (FR) .......................................... 99 03 013

(51) Int. Cl.[7] ............................ H01M 2/10; B60L 11/18
(52) U.S. Cl. ..................... 429/99; 429/100; 211/59.4; 211/119.003; 180/68.5
(58) Field of Search ........................... 429/96, 99, 100; 180/68.5; 211/49.1, 59.4, 119.003, 153, 59.2

(56) References Cited

U.S. PATENT DOCUMENTS

| | | | | |
|---|---|---|---|---|
| 3,202,291 A | * | 8/1965 | Root | 211/49.1 |
| 3,439,811 A | * | 4/1969 | Bell | 211/149.1 |
| 4,121,718 A | * | 10/1978 | Bannister | 211/149.1 |
| 5,038,942 A | * | 8/1991 | Wright | 211/40 |
| 5,403,679 A | * | 4/1995 | Stone | 429/99 |
| 5,441,123 A | * | 8/1995 | Beckley | 180/68.5 |
| 5,981,101 A | * | 11/1999 | Stone | 429/100 |
| 6,111,387 A | * | 8/2000 | Kouzu et al. | 429/99 X |
| 6,162,559 A | * | 12/2000 | Vutetakis et al. | 429/100 |

FOREIGN PATENT DOCUMENTS

| | | | | |
|---|---|---|---|---|
| JP | 60 236454 | | 11/1985 | ............ H01M/2/10 |
| JP | 60-236454 | * | 11/1985 | ............ H01M/2/10 |

* cited by examiner

*Primary Examiner*—Stephen J. Kalafut
(74) *Attorney, Agent, or Firm*—Young & Thompson

(57) ABSTRACT

A box for a set of electric storage batteries for an electric motor vehicle includes at least two mutually opposite side walls (14, 16) extending substantially parallel and defining between them a housing for receiving batteries. Each side wall (14, 16) is internally provided with a series of projecting support elements (30, 32) extending along the wall, each support element (30,32) forming, jointly with a support element of the other side wall, a support for at least one rack of storage batteries.

8 Claims, 4 Drawing Sheets

BOX FOR SET OF ELECTRIC STORAGE BATTERIES

BACKGROUND OF THE INVENTION

The present invention relates to a box for a set of electric storage batteries for an electric self-propelled vehicle, such as a maintenance machine, the box being particularly suitable for holding batteries made of sealed gas-recombination elements.

It also relates to a modular system of boxes made up of a combination of such boxes.

In the prior art, sets of batteries are made up of a combination of rechargeable self-contained elements each capable of delivering a voltage of about 2 volts, all arranged in parallel or in series in a box, and this box fits into a location provided in the vehicle for this purpose to act as the vehicle's power source.

As will be appreciated, in order to keep the number of battery charging and discharging cycles to a minimum, and therefore increase their life, as many elements as possible must be carried on the vehicle.

However, increasing the number of elements has the effect of increasing the amount of heat evolved during operation.

Document JP-A-60236454 shows a box comprising rails for receiving removable supports, in which the batteries are placed, and not the batteries themselves. Its is purely an element for storing batteries that allows a visual check of the number and condition of the batteries it contains.

SUMMARY OF THE INVENTION

Its subject is therefore a box for a set of electric storage batteries for an electric self-propelled vehicle, comprising at least two mutually opposite side walls extending substantially parallel and defining between themselves a housing for receiving batteries, characterized in that each side wall is internally provided with a series of projecting support elements extending along the wall, each support element forming, jointly with a support element of the other side wall, a support for a layer of storage batteries.

The box according to the invention may also include one or more of the following characteristics, taken in isolation or in all technically possible combinations:

the support elements consist of shelves which are attached on the side walls;

the support elements are formed by longitudinal folds in the side walls;

the support elements extend along the walls at an inclined angle to the horizontal;

the support elements also comprise battery holding means arranged in the vicinity of at least one of the free ends of the side walls;

it also comprises two end plates mounted on the free ends of the side walls;

at least one of the end plates is mounted detachably on the side walls;

the end plates are each provided with a handling point designed to be engaged by a lifting apparatus.

The invention also relates to a system of boxes for a set of electric storage batteries for an electric self-propelled vehicle, characterized in that it comprises a modular set of electrically connected boxes as defined above.

BRIEF DESCRIPTION OF THE DRAWINGS

Other features and advantages will be found in the following description, given solely by way of example, with reference to the appended drawings, in which.

DETAILED DESCRIPTION OF THE PREFERRED EMBODIMENTS

Figure 1:
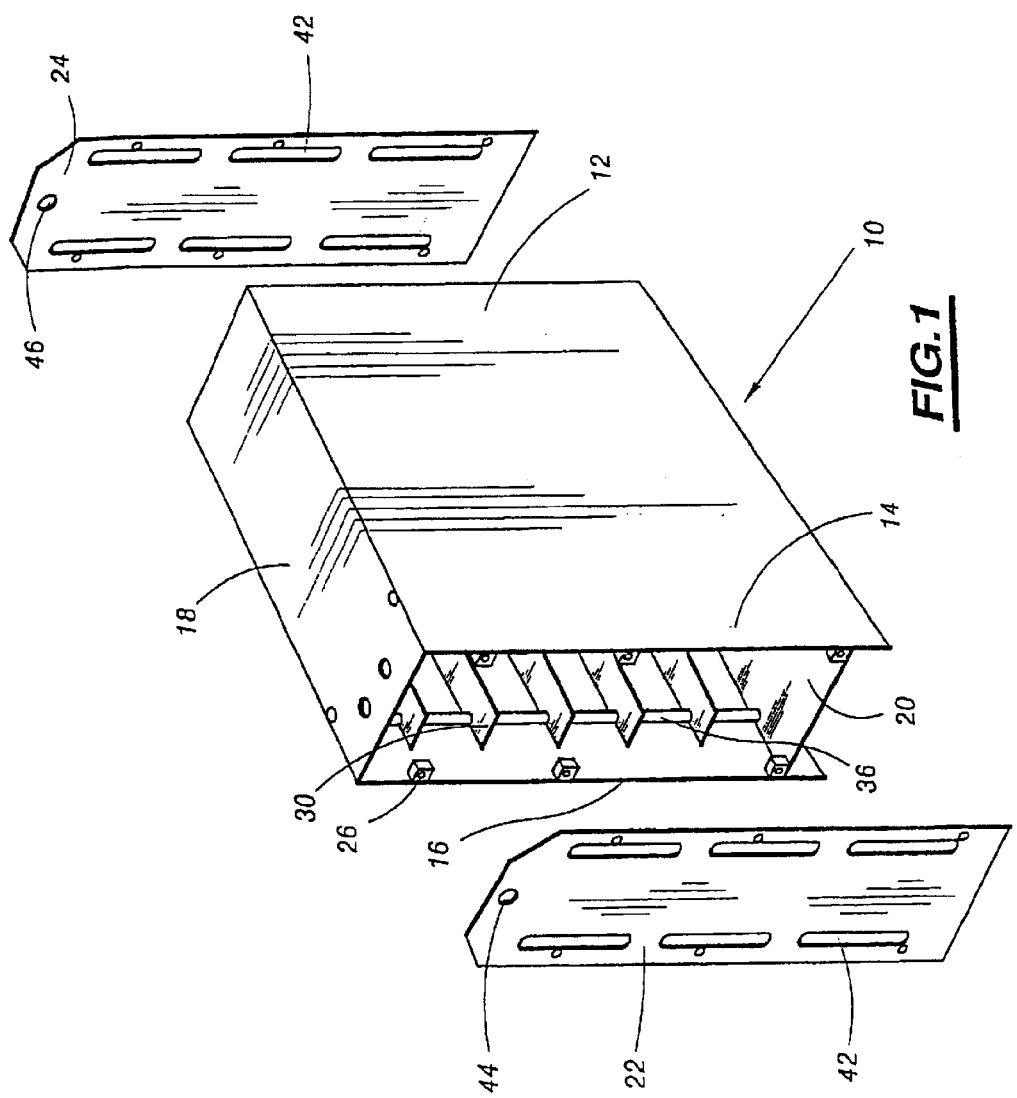
FIG. 1 is an exploded perspective view of a box for a set of batteries in accordance with the invention.
Figure 2:
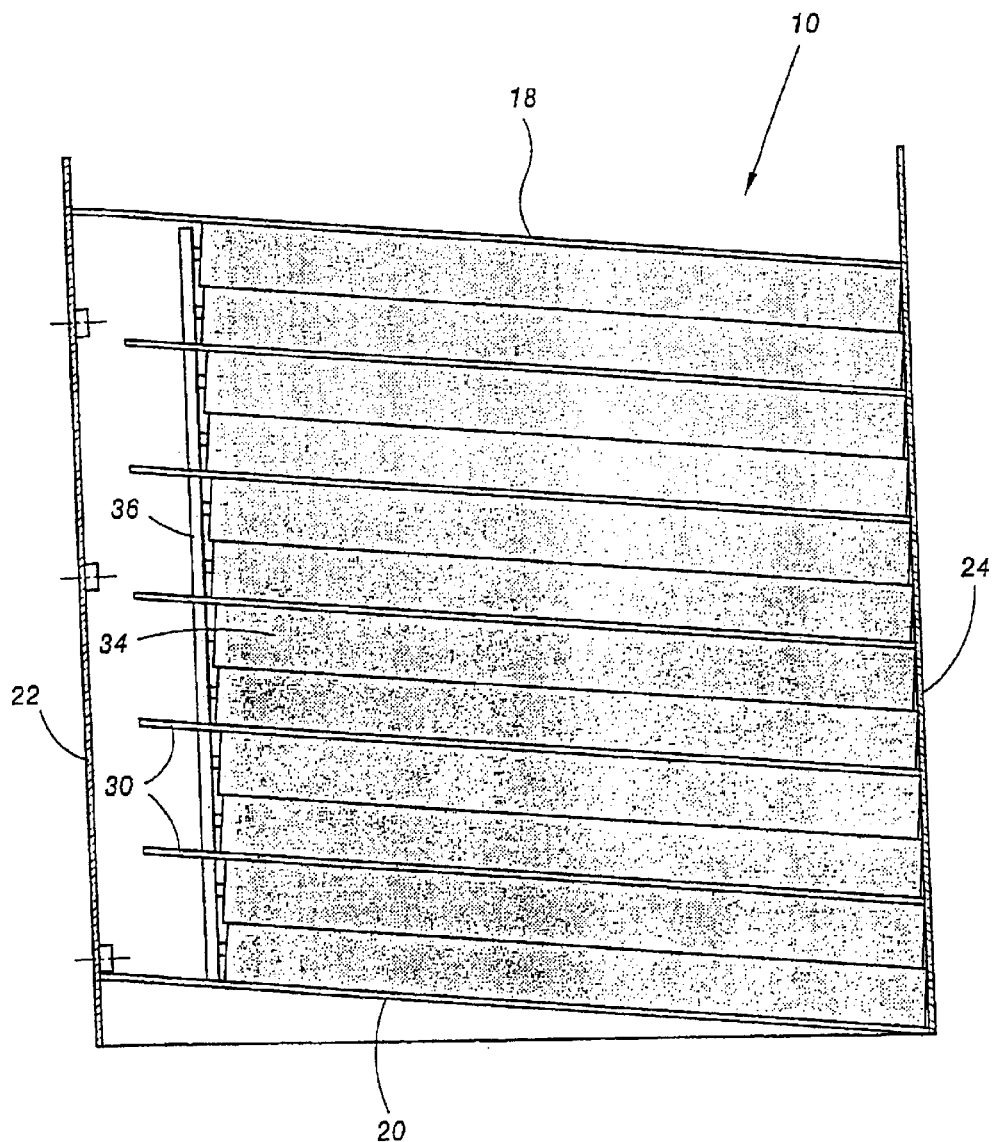
FIG. 2 is a longitudinal section through the support shown in FIG. 1, in the assembled condition.
Figure 3:
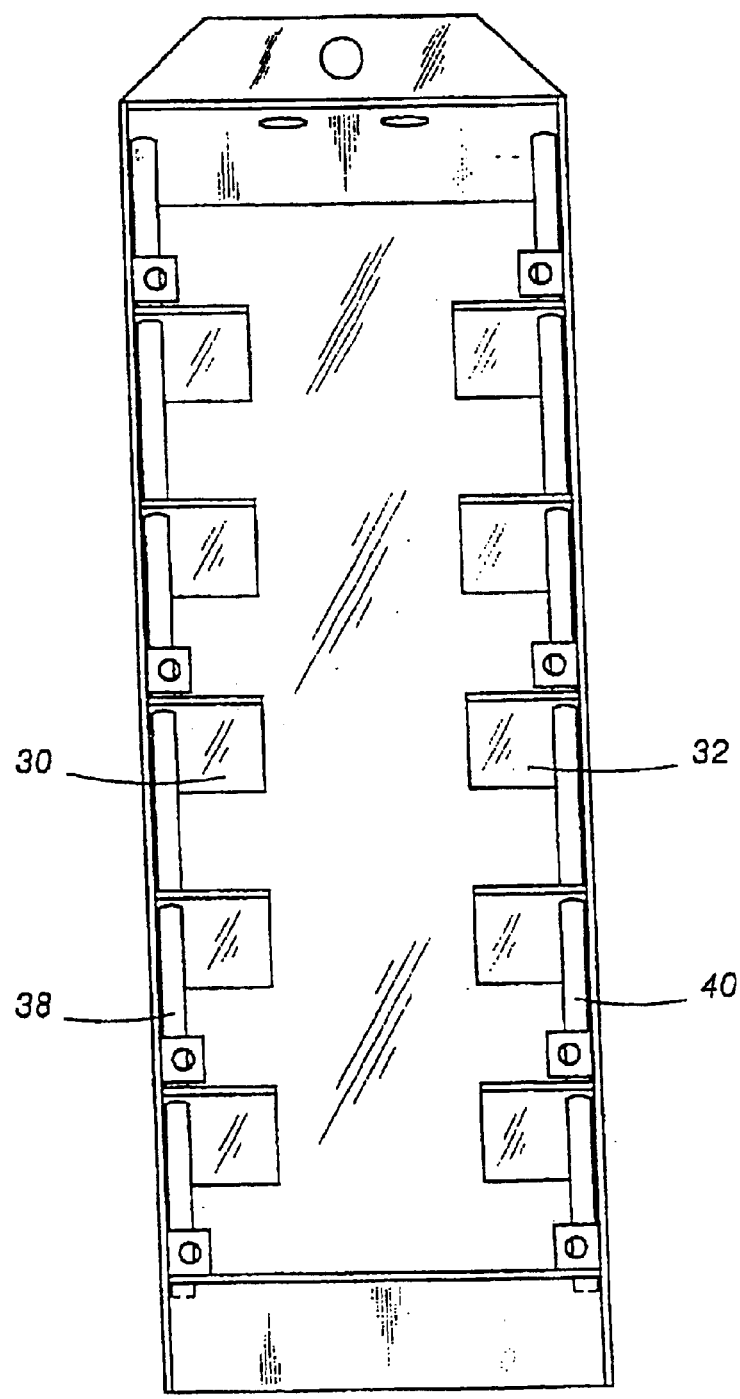
FIG. 3 is a side view of the box shown in FIG. 1, in the assembled condition.

FIGS. 1–3 show a first embodiment of a box in accordance with the invention, denoted by the general reference number 10, in what will be assumed to be a vertical position.

The box is designed to accommodate a set of electric storage batteries consisting for example of sealed gas-recombination elements. The box is designed to be placed in an electric self-propelled machine, such as a maintenance machine.

The box 10 consists mainly of a case 12 having the general form of a rectangular profile with two side walls 14 and 16, an upper wall 18 and a bottom 20.

Two end plates 22 and 24 are attached, e.g. by screws to the free ends of the case 12, by means of fixing lugs such as 26 provided on the case 12 near the free ends of the side walls 14 and 16. At least one of the end plates 22 and 24 can be removed from the case 12.

It will be observed that the box 10 is made of a material appropriate for the intended use, for example a metal or a plastic.

As is also visible in FIGS. 2 and 3, support elements such as 30 and 32 are attached to each of the side walls 14 and 16 at regular intervals along the height of the walls 14 and 16, each support element extending along the corresponding wall and forming, jointly with a support element on the other side wall, a support on which one or more layers of storage batteries such as 34 rest.

As shown particularly in FIG. 3, the support elements 30 and 32 forming one battery layer extend towards each other in the same plane and are separated from each other by a distance smaller than the length, or the width, of the batteries.

The support elements 30 and 32 preferably extend along the side walls 14 and 16 at an inclined angle to the horizontal to enable easy loading of the box 10.

Holding means denoted by the general reference number 36 are provided at at least one end of the support elements 30 and 32 in order to hold the battery elements in position.

As an example and as illustrated, these holding means 36 consist of stops mounted removably or non-removably on the support elements 30 and 32 and take the form of rods 38 and 40 extending down through the support elements 30 and 32.

The assembled case 12 and end plates 22 and 24 constitutes the box, and the box can accommodate a relatively large number of electric storage batteries in the form of several layers of batteries, each supported by two support elements 30 and 32.

It will be realized that this box 10 allows heat generated during operation to be evacuated by allowing air to circulate through the space left between the layers of batteries corresponding to the thickness of the support elements 30 and 32.

In order to improve the ventilation of the batteries, the end plates 22 and 24 may advantageously be fitted with ventilation openings such as 42.

The box 10 may also be provided with handling points consisting of orifices 44 and 46 in the end plates 22 and 24 to accommodate a hook of a lifting apparatus for placing the box in an electric vehicle as its power supply and for replacing the latter.

In the illustrative embodiment shown in FIGS. 1 and 2, the support elements consist of shelves inserted and fixed by for example welding to the side walls 14 and 16.

Figure 4:
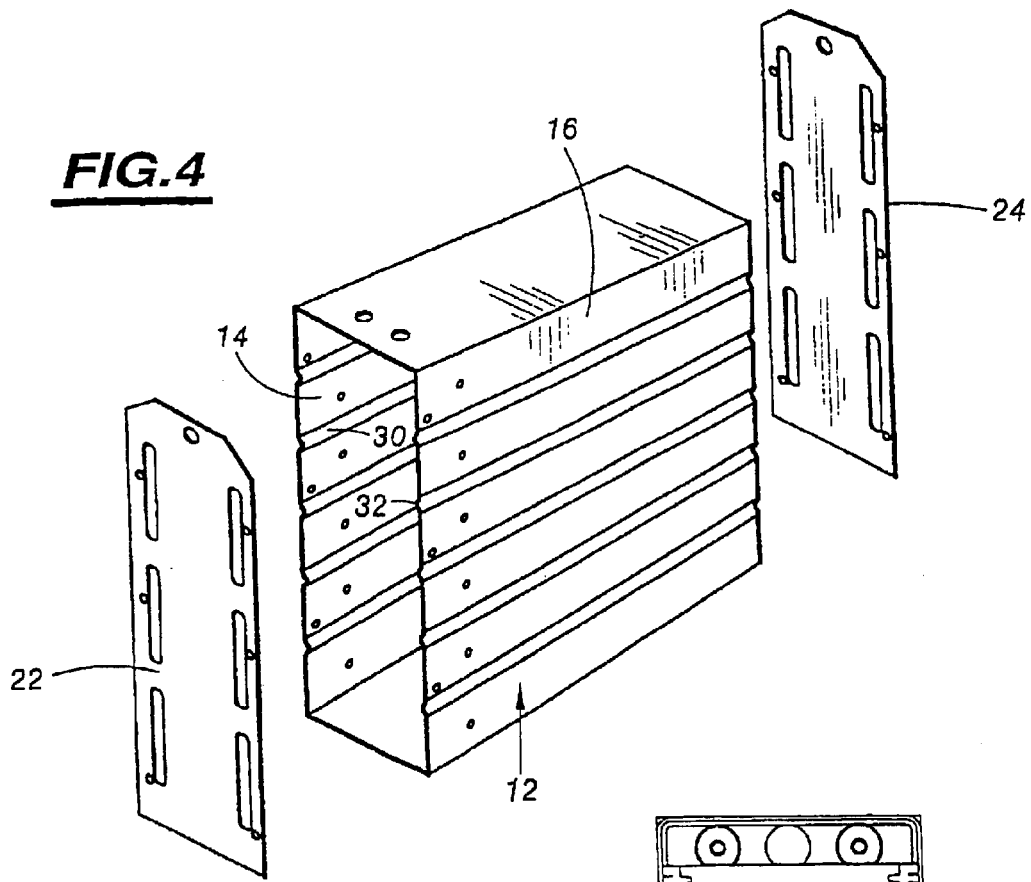
FIG. 4 is an exploded perspective view of another embodiment of a box according to the invention.
Figure 5:
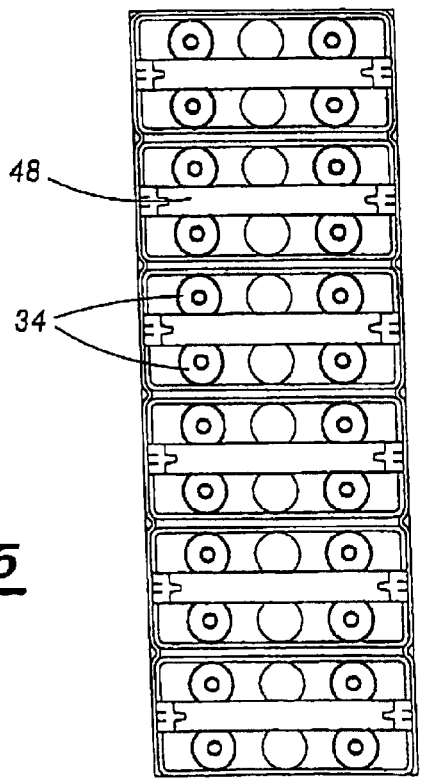
FIG. 5 is a side view of the box shown in FIG. 4.

As illustrated in FIGS. 4 and 5, which show another embodiment of the box according to the invention, and in which parts identical to those in FIGS. 1–3 are given the same reference numbers, the support elements 30 and 32 can also be formed by folding the side walls 14 and 16.

It will also be seen that the support elements 30 and 32 can be made in such a way that they extend horizontally along the side walls.

The battery holding means may also be formed in the form of spaces, such as 48, extending between the side walls 14 and 16 on each battery rack.

Lastly, it will be observed that, depending on the amount of space available in the vehicle and the electric power to be delivered, a modular system of boxes can be made by combining several boxes identical to those described above and connecting them electrically in series or in parallel.

It will be understood that the invention described above, which uses a box having side plates, at least one of which is removable, and having battery supports allowing a relatively large number of batteries to be loaded into a small space while enabling efficient ventilation thereof, greatly increases the life of the battery stored in this way, in that it greatly limits the number of cycles of discharging and recharging.

It also makes the operation of installing the battery elements very easy to carry out and greatly facilitates maintenance because the presence of the ventilation openings in the side plates makes the batteries accessible from the exterior.

What is claimed is:

1. A combination of a box for a set of electric storage batteries for an electric self-propelled vehicle and a set of electric storage batteries, said box comprising:

a top;

a bottom;

two mutually opposite side walls extending between said top and bottom and defining therebetween a housing for receiving said set of storage batteries, one of said side walls having a plurality of support elements extending longitudinally along said one of said side walls, another one of said side walls having a plurality of support elements extending longitudinally along said another one of said side walls, coplanar with said plural support elements of said one of said side walls, so that a pair of coplanar support elements directly contacts and supports at least one battery of said set of electric storage batteries and provides a space between each battery of said set of electric storage batteries.

2. The combination as claimed in claim 1, wherein a distance between said plural supports of said one of said side walls and said plural supports of said another one of said side walls is less than a width of said at least one battery.

3. The combination as claimed in claim 1, wherein each of said support elements extend along said side walls at an angle inclined with respect to a horizontal plane.

4. The combination as claimed in claim 3, wherein the box further comprises two end plates connected to said top, said bottom and said side walls and removably enclosing said housing.

5. The combination as claimed in claim 4, wherein said end plates each comprise a plurality of ventilation openings therethrough.

6. The combination as claimed in claim 4, further comprising a battery holding element connected perpendicularly between adjacent ones of said plural support plates on each said side walls.

7. The combination as claimed in claim 6, wherein one end of each battery contacts one of said two end plate and another end of each battery contacts said battery holding element.

8. The combination as claimed in claim 1, comprising a plurality of boxes connected in parallel.

* * * * *